United States Patent [19]

Siemonsma

[11] Patent Number: 4,674,586

[45] Date of Patent: Jun. 23, 1987

[54] ROLLAWAY OIL DRAIN PAN

[76] Inventor: William Siemonsma, Box 37, Lyons, S. Dak. 57041

[21] Appl. No.: 853,705

[22] Filed: Apr. 18, 1986

[51] Int. Cl.$^4$ .......................... F16N 31/00; B61B 3/00
[52] U.S. Cl. .................... 184/106; 104/242; 105/148
[58] Field of Search .............. 184/1.5, 106; 104/32 A, 104/32 R, 94, 107; 105/133–148; 16/19, 29, 30, 33, 97, 98, 102; 248/360, 318, 298; 312/341 R

[56] References Cited

U.S. PATENT DOCUMENTS

| | | | |
|---|---|---|---|
| 1,551,576 | 9/1925 | Lowden | 104/94 |
| 1,551,577 | 9/1925 | Lowden | 104/133 |
| 1,573,918 | 2/1926 | Dewhirst | 104/32 A |
| 1,575,371 | 3/1926 | Lowden | 104/133 |
| 2,577,188 | 12/1951 | Hall | 184/106 |
| 2,761,396 | 9/1956 | Harlan | 105/148 |
| 3,653,464 | 4/1972 | Jacobsen | 184/106 |
| 3,827,366 | 8/1974 | Pamer | 104/94 |
| 4,235,264 | 11/1980 | Rau | 184/106 |
| 4,248,026 | 2/1981 | Tipton | 182/36 |
| 4,289,076 | 9/1981 | Miller | 105/148 |

Primary Examiner—Carlton R. Croyle
Assistant Examiner—Jane E. Obee

[57] ABSTRACT

An oil drainage pan construction for fast oil change establishments comprising a rectangular open topped pan having a screen over the top with the pan adapted to be rolled longitudinally along beneath an automobile chassis which is mounted on spaced beams having flanges. The pan has rollers to roll on the flanges for supporting the pan and the rollers are carried on brackets which are laterally extensible to support and adjust the pans and insure that the wheels are in engagement with the flanges and the brackets are reversible to change the height of the pan with plates on the ends of the brackets to slide along the ends of the flanges and positively align the pan.

13 Claims, 7 Drawing Figures

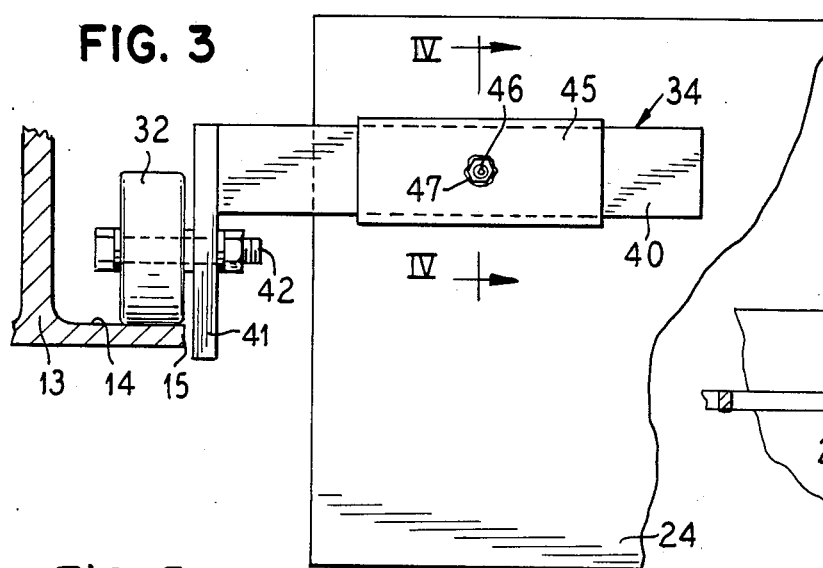
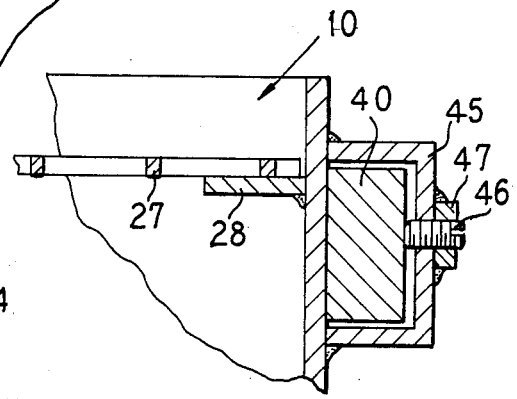
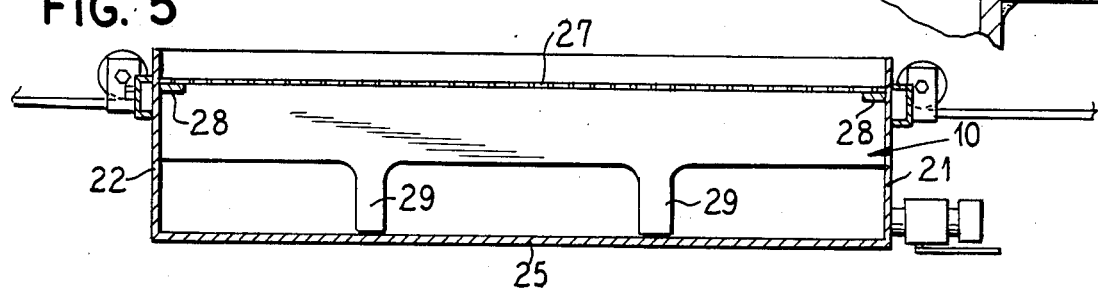
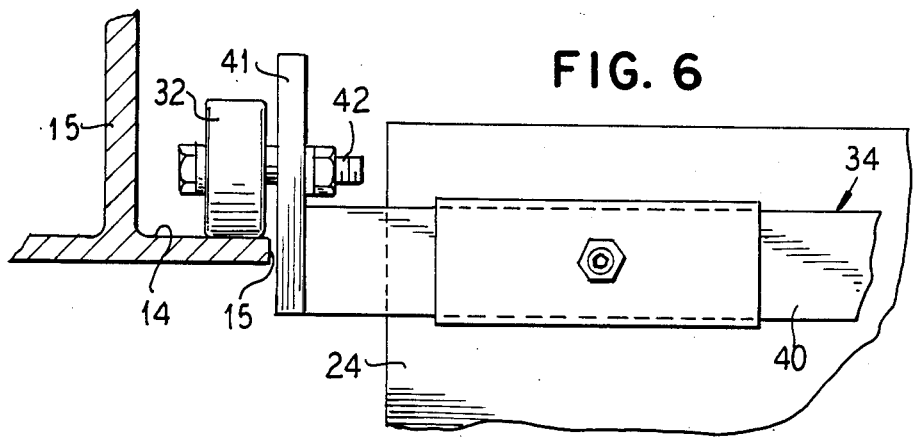
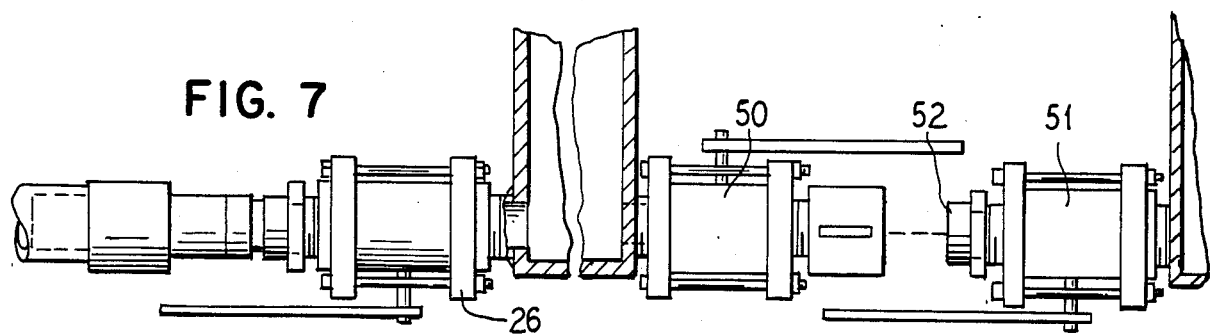

ROLLAWAY OIL DRAIN PAN

BACKGROUND OF THE INVENTION

The invention relates to improvements in oil drainage pan constructions of the type where an automobile is positioned over a pit or other support and the pan is movable to a location beneath the oil drain orifices of the auto.

Oil drain establishments have found commercial acceptance offering fast service and quick oil change. The present invention relates to an improved oil drainage pan and its supports for existing oil change establishments, but is particularly well suited in fast oil change operations.

In this type of establishment, the automobile may be supported on its chassis on parallel beams, but frequently these beams are positioned longitudinally parallel to the auto at the sides of a pit beneath the auto and the auto is driven over the pit. The beams may be in the form of I-beams with a lower flange projecting laterally on each of the beams and the flange running parallel to the length of the auto. In the oil change operation, the operator is located in the pit and removes the plug from the oil drain orifice to drain the oil into a collector. Particularly in fast change establishments, a pan of substantial size is preferred, not requiring the pan to be positively located relative to the orifice so that the operator can generally locate the pan beneath the crank case, and remove the oil drain plug as well as the oil filter allowing them to drop to the pan so that the oil can be quickly drained from the auto. When drainage is completed, the pan frequently advantageously will be moved to a location beneath the transmission and perhaps also the differential for drainage. For these functions, it is essential that the pan be moved easily and quickly, hold a substantial amount of oil, have fittings for eventually draining the oil from the pan, and be safely and sturdily supported so that it does not drop down into the pit and yet be completely mobile to the different locations beneath the oil drain orifices beneath the auto.

To permit removal of the oil filter and the oil drain plugs with the oil draining downwardly without burning the attendant, a screen is positioned over the top of the pan to catch the plugs and the oil filter. As soon as the oil is drained out, the attendant will replace the plug and put in a new filter so that new oil can be filled into the automobile. This is also the case where oil is drained from the transmission and the differential.

As oil is drained from a number of autos and in rapid succession, which occurs inasmuch as commercial establishments offer oil changes in a short period such as from 10 to 20 minutes, a substantial weight of oil is within the pan. The pan must continue to be mobile to be rapidly moved and oriented beneath a new auto driving in above the pit inasmuch as the auto is not always positively located and oil drain locations vary from auto to auto. It is essential that such pans continue to operate without difficulty and without any possible risk of the pan dropping downwardly to dump the oil and/or injure the attendant. Further, a provision must be made for collecting the oil both for continued operation and because the collected crank case draining is sold for commercial purposes.

It is also advantageous to have a pan which can be mounted so as to be varied in height in that different establishments may have support beams which are different distances from the bottom of the automobile chassis. The change in height must be accomplished without risk of the pan being dropped, that is, with retaining a reliable mobile support for the pan.

It is accordingly an object of the present invention to provide an improved oil pan construction which meets the foregoing objectives and advantages and which attains mobility of the pan even with a heavy load of oil laterally along beneath the auto chassis with assuredness and safety and without risk of the pan dropping down into the oil pit beneath the auto.

A further object of the invention is to provide an improved mobile oil pan for drainage of oil from automobiles which is of durable and simplified construction and is capable of a long operating life so that its durability and operation can be guaranteed by the maker to the user and the user can continue using the structure reliably over a long period of time without replacement.

A further object of the invention is to provide an improved oil drainage pan means for adjusting the height of the pan relative to the automobile where an improved support and mobility arrangement is provided.

Other objects and advantages will become more apparent with the teaching of the principles of the invention in connection with the disclosure of the preferred embodiment thereof in the specification, claims and drawings in which:

DESCRIPTION OF THE DRAWINGS

FIG. 3 is an enlarged fragmentary view of the roller support assembly for the pan;

FIG. 4 is a fragmentary sectional view taken substantially along IV—IV of FIG. 3;

FIG. 5 is a sectional view taken substantially along line V—V of FIG. 1;

FIG. 6 is an enlarged detailed view of the roller support, similar to FIG. 3 but at the other side of the pan; and FIG. 7 is a fragmentary view with parts removed of the connection between multiple pans.

DESCRIPTION OF THE PREFERRED EMBODIMENT

Figure 1:
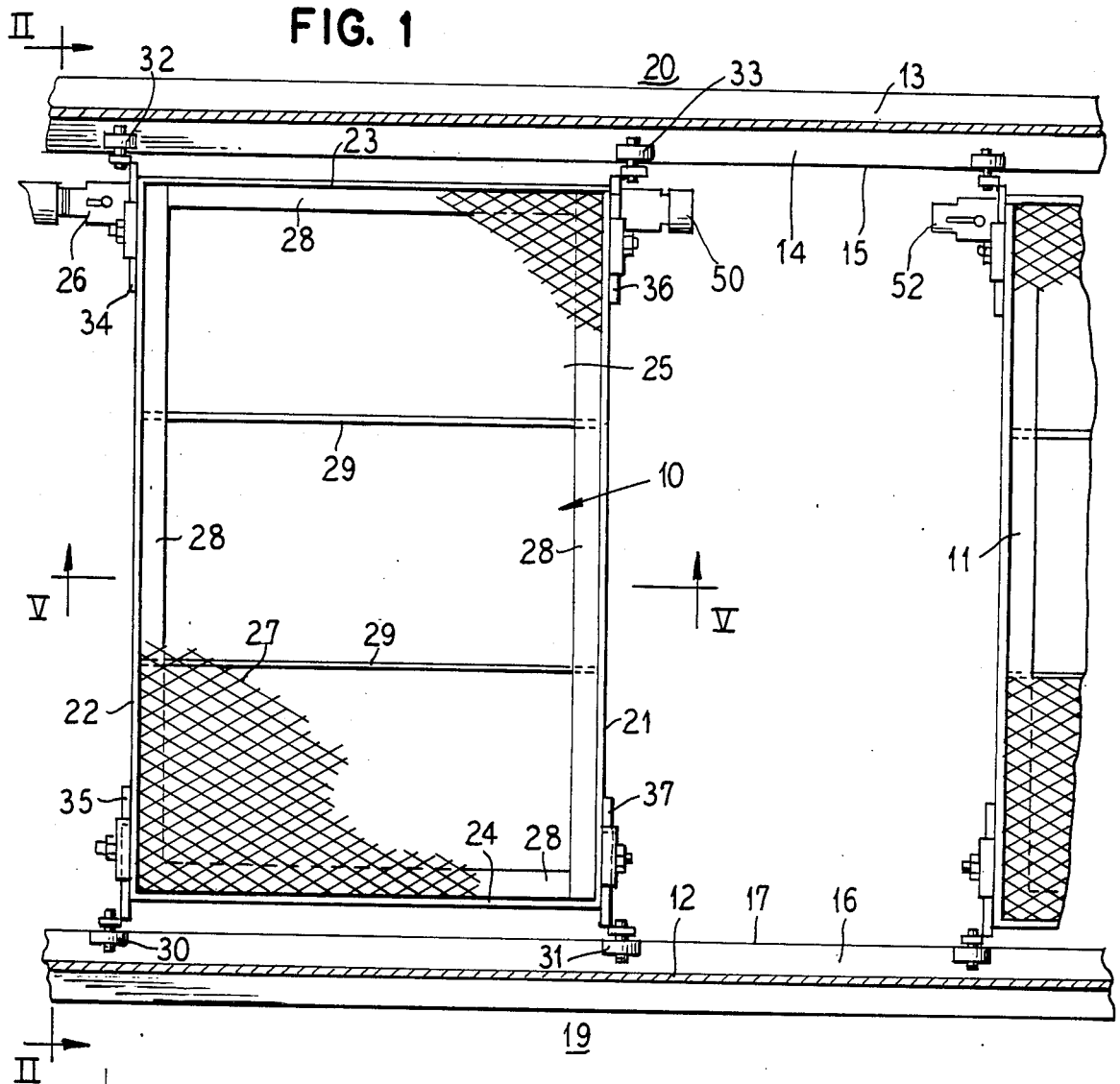
FIG. 1 is a top plan view of a oil drain pan construction constructed and operating in accordance with the principles of the present invention.
Figure 2:
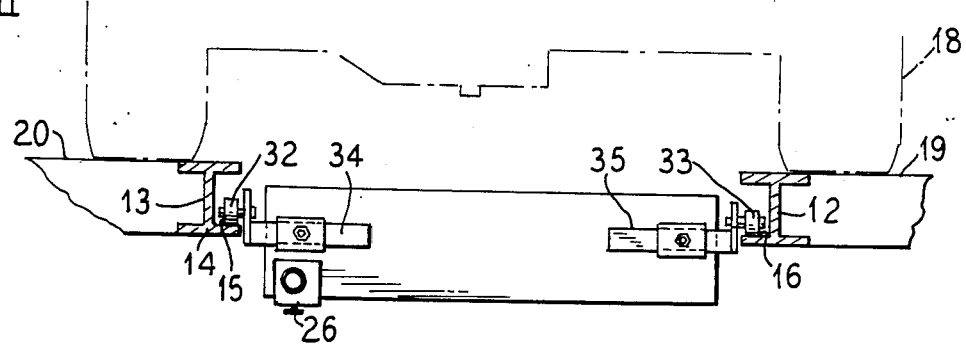
FIG. 2 is an end elevational view taken substantially along line II—II of FIG. 1.

As illustrated in FIGS. 1 and 2, an oil pan 10 is provided for positioning beneath an automobile and catching drainage oil. In a muliple automobile installation, plural drainage pans may be provided at spaced locations over a pit. The pit is so arranged that at its sides are I-beams 12 and 13 which have lower flanges 14 and 16. The flanges have edges 15 and 17. The upper surface of the flanges will be used to support rollers to carry the pans. At the sides of the I-beams, as illustrated in FIG. 2 are the floor surfaces 19 and 20 supporting the wheels of an auto 18. The auto is driven into the building onto the floor over the pit with the attendant being located in the pit to remove the drain plugs and oil filter and to permit the oil to drain into the pan 10.

The pan is preferably rectangular in construction having sidewalls 21, 22 at the leading and trailing ends and at 23 and 24 at the sides. The pan has a bottom 25 which preferably slopes to a drain fitting 26, and the top of the pan is generally open. For helping in preventing splattering of oil and primarily for catching dropping plugs and filters, an expanded metal screen 27 is positioned over the top of the pan. This screen is preferably at a horizontal location spaced downward from the top edge of the pan and is supported on a ledge 28 extending around within the inner surface of the four sides of the pan, welded to the pan as illustrated in FIGS. 4 and 5. This ledge provides strength for the sides of the pan as well as a support for the expanded metal screen.

For supporting the pan, rollers 32 and 33 at one side of the pan roll on the flange 14 of one I-beam and rollers 30 and 31 at the other side of the pan roll on the horizontal surfaces of the flange 16 of the other I-beam. It is essential that these rollers not be permitted to slip off this horizontal surface and that the pan be maintained in its orientation so that the sides 23 and 24 maintain generally parallel to the I-beam.

The rollers 30, 31, 32 and 33 are rotatable on bolts shown generally at 42 in FIGS. 3 and 6, and inasmuch as each of the rollers is similarly supported, only one need be described in detail. The rollers are preferably plastic, although other materials can be used, and rotate on a sleeve supported on a bolt 42 and drawn tight against a vertical plate 41. The vertical plate 41 is welded at the end of a bracket 34. The bracket includes a flat plate 40 which lays flat against the end wall of the pan.

As shown in FIG. 1, a bracket is provided for each of the rollers with the brackets being shown at 34, 35, 36 and 37 respectively for rollers 32, 30, 33 and 31.

An important feature is that the brackets are laterally horizontally adjustable relative to the pan and can be locked in their adjusted position. For this purpose the bracket arms 40 extend into U-shaped clamps or sockets 45 which have their ends welded to the sides of the pan as illustrated in FIG. 4. The U-shaped holders 45 are slightly larger than the arms 40 so that the arms can be slidably horizontally adjustable. When the arm is moved to its desired adjustment, it is locked in place by a set screw 46 which is threaded into a nut 47 welded to the U-shaped member 45.

The arms 40 of each of the brackets holding the roller are adjusted so that the rollers are in their proper places on the ledges of the I-beams. At this location, the vertical plates 41 to which each of the rollers are mounted, extend so that they have an outer face which is in opposing possible contact sliding engagement with the edge 15 of the I-beam. Thus, with each of the plates 41 engageable with the edges 15 and 17 of the I-beam, the pan will be held in its correct rectilinear position relative to the I-beam so that the rollers will not track off of the flanges of the I-beams.

Another significant factor of the structure is that the rollers are mounted off-center in a vertical direction of the arms 40. This may be seen in FIG. 3 where it is seen that the roller 32 is below the arm 40. The arm, however, is reversible so that it can be turned to the position shown in FIG. 6. In FIG. 3 the pan is in its uppermost position, and FIG. 6 in the lowermost position. Thus, by merely flopping over or reversing the arms 40 in their U-shaped brackets, the pan elevation can be changed. In the lower position of the pan, as shown in FIG. 6, the outer face of the plate 41 continues to be in facing engageable position relative to the outer edge 15 of the I-beam. Thus, in either the raised or lowered position of the pan, the plates 41 will function as a guiding alignment means for holding the pan in position and insuring that the rollers will continue to track and ride on the edges of the I-beam flange. Also, in this simplified way, the pan can be raised or lowered to accommodate different establishments. The manufacturer of the pan can make one pan for various establishments and the owner of the establishment can set the brackets for the rollers in either position depending on the relationship of the I-beam to the chassis of the automobile.

The pan will be sufficiently strong to insure that the sidewalls will not collapse or change and so that the rollers can support the entire weight of the pan and its contents. Strength is afforded by the lips or flanges 28 extending around the inside of the walls. Additional strength is afforded by the expanded metal screen 27. Still further strength is afforded by vertical baffles shown at 29 in FIG. 5. These baffles have portions extending fore and aft of the pan as indicated in FIG. 1 and have supporting portions extending to the pan bottom 25 as indicated in FIG. 5.

Where multiple pans are employed as indicated in FIGS. 1 and 7, connections 50 are provided for one pan and 52 for the pan following. This permits drainage of the rear pan 11 through the forward pan 10 through the drain opening 26. It also permits movement of the oil from one pan to another when one pan gets over full before drainage can be accomplished. A flexible connection, shown schematically by a broken line (FIG. 7) between connections 50 and 52 joins the pans for transfer of oil from one pan to the other. Suitable valves may be provided at the drainage opening with valve arms to open or close the valves and permit oil transfer.

As illustrated in FIG. 7, the drain for the pan is connected to be approximately $\frac{3}{8}''$ off of the pan bottom. This permits draining while trapping sludge within the pan. With this construction, the sludge can be removed once a week from the pan bottom such as by removal of the expanded metal screen 27. In structures heretofore used, drain openings were employed at the bottom of the pan so that the sludge drained into the collection well to which the pan drained and the sludge was trapped there in a container which was difficult if not impossible to clean. By trapping the sludge in the pan, the sludge can be handled and thrown away without mixing with the reusable oil. For this reason, a flat bottom 25 is preferred on the pan so that the sludge tends to stay in the pan. If a sloping bottom is employed, the sludge will drain toward the opening and the flat bottom coupled with the outlet connection being slightly above the pan floor permits trapping of the sludge.

Thus, it will be seen I have provided an improved oil pan construction which meets the objectives and advantages above set forth. With uniform construction, pans can serve establishments which require that the pans be at different levels. The pans are also adaptable to establishments wherein the pits are of different width by merely extending the arms supporting the rollers in the pan so that the rollers properly engage the flanges of the I-beams, and the brackets are then locked in position so that one construction is adapable for multiple sizes of drainage pits.

I claim as my invention:

1. An oil drainage pan construction for fast oil change establishments comprising in combination:
   an upwardly facing pan open for receiving oil and adapted for adjustment movement beneath an auto chassis from position to position beneath automobile oil drain orifices for the drainage of oil from an auto, the auto being carried on a support having flanged beams extending parallel to the auto;

wheels at the sides of the pan for rolling engagement with the flanges of the beams and supporting the pan between the beams;

a laterally extending bracket for each of the wheels connected to the pan; and means for adjustably locking the laterally extended position of the bracket to positively locate the wheels on said flanges, wherein said brackets are reversible to change the height of the pan.

2. An oil drainage pan construction for fast oil change establishments comprising in combination an upwardly facing pan open for receiving oil and adapted for adjustment movement beneath an auto chassis from position to position beneath automobile oil drain orifices for the drainage of oil from an auto, the auto being carried on a support having flanged beams extending parallel to the auto;

wheels at the sides of the pan for rolling engagement with the flanges of the beams and supporting the pan between the beams;

a laterally extending bracket for each of the wheels connected to the pan;

means for adjustably locking the laterally extended position of the bracket to positively locate the wheels on said flanges;

said wheels being supported off-center on the bracket portion so that with reversal of the bracket portion, the height of the pan can be changed.

3. An oil drainage pan construction for fast oil change establishments comprising in combination:

an upwardly facing pan open for receiving oil and adapted for adjustment movement beneath an auto chassis from position to position beneath automobile oil drain orifices for the drainage of oil from an auto, the auto being carried on a support having flanged beams extending parallel to the auto;

wheels at the sides of the pan for rolling engagement with the flanges of the beams and supporting the pan between the beams;

a laterally extending bracket for each of the wheels connected to the pan;

means for adjustably locking the laterally extended position of the bracket to positively locate the wheels on said flanges; and each bracket having a guide plate portion slidably engageable with the edge of the flange for positioning the pan between the beams and guiding the wheels to continue to roll on the flanges.

4. An oil drainage pan construction for fast oil change establishments constructed in accordance with claim 3:

wherein the brackets are reversible and the plate portion slidably engages the edge of the flange in either reversed position of the bracket.

5. An oil drainage pan construction for fast oil change establishments constructed in accordance with claim 4:

including a screen over the top of said pan for receiving oil orifice closing plugs preventing them from dropping into the pan.

6. An oil drainage pan construction for fast oil change establishments constructed in accordance with claim 4:

including means for positively locking the lateral position of said brackets.

7. An oil drainage pan construction for fast oil change establishments constructed in accordance with claim 3:

wherein each of said brackets has a flat portion adjustably secured to a wall of the pan and has a vertical plate portion at the end supporting the wheels.

8. An oil drainage pan construction for fast oil change establishments constructed in accordance with claim 4:

wherein the pan is generally rectangular in shape and has cross baffles extending through the pan.

9. An oil drainage pan construction for fast oil change establishments constructed in accordance with claim 8:

wherein the top edge of the pan has a lip which is secured to said baffles.

10. An oil drainage pan construction for fast oil change establishments comprising in combination:

a plurality of generally rectangular open top pans adapted for adjustable movement between individual separate auto chassis to be positioned beneath auto oil drain orifices of individual automobiles with the automobiles being carried on a support having flanged beams extending parallel to the auto;

quadrilaterally located wheels on each of the pans for rolling engagement with the flanges of the beams;

a bracket for each of the wheels connected to the pan with the wheel being eccentrically mounted in a vertical direction relative to the center of the bracket so that as the bracket is reversed the pans will be mounted at different heights;

means for adjustably locking the lateral extended portion of the bracket relative to the pan to positively locate the wheels in said flanges; and oil drain communication connections on the ends of the pans in facing relationship accommodating flexible connections of the pans to each other to transfer oil from one pan to another.

11. An oil drainage pan construction for fast oil change establishments comprising in combination:

a generally rectangular open topped pan adapted for adjustment movement beneath a chassis to be positioned beneath an automobile oil drain orifice for changing oil, the auto being carried on a support having flanged beams extending parallel to the auto;

quadrilaterally located wheels on the pan for rolling engagement with the upper surfaces of the flanges of the beams;

a bracket for each of the wheels connected to the pan having a flat portion lying against an end face of the pan;

vertical plates at the ends of the brackets rotatably supporting the wheels and having a sliding face for engaging the edge of the flange to positively locate the pan between the beams; and means for adjustably locking the laterally extending position of the brackets to positively locate the wheels on said flanges and position the pan spaced between the beams.

12. An oil drainage pan construction for fast oil change establishments constructed in accordance with claim 11:

including a U-shaped clamp secured to the end of the pan for receiving said bracket and supporting the pan on the bracket.

13. An oil drainage pan construction for fast oil change establishments constructed in accordance with claim 11:

including a locking bolt threaded into the bracket and forcibly pressing the bracket against the end of the pan to lock its laterally adjusted position.

* * * * *